United States Patent
Haugen et al.

(10) Patent No.: US 6,925,636 B2
(45) Date of Patent: Aug. 2, 2005

(54) METHOD AND APPARATUS FOR REFINING AN ALIAS SET OF ADDRESS TAKEN VARIABLES

(75) Inventors: Patrick Todd Haugen, Altura, MN (US); Tim Clayton Muehe, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 477 days.

(21) Appl. No.: 09/813,255

(22) Filed: Mar. 20, 2001

(65) Prior Publication Data

US 2004/0205320 A1 Oct. 14, 2004

(51) Int. Cl.[7] .............................................. G06F 9/45
(52) U.S. Cl. ..................... 717/146; 717/156; 711/210
(58) Field of Search ............................... 717/140–159; 711/210

(56) References Cited

U.S. PATENT DOCUMENTS

| | | | | |
|---|---|---|---|---|
| 5,613,117 A | * | 3/1997 | Davidson et al. | 717/144 |
| 5,613,121 A | * | 3/1997 | Blainey | 717/151 |
| 6,045,585 A | * | 4/2000 | Blainey | 717/156 |
| 6,077,311 A | * | 6/2000 | Lichtenstein et al. | 717/128 |
| 6,173,444 B1 | * | 1/2001 | Archambault | 717/159 |

* cited by examiner

Primary Examiner—Tuan Dam
Assistant Examiner—Chuck Kendall
(74) Attorney, Agent, or Firm—Moser, Patterson & Sheridan, LLP (57) ABSTRACT

A method, apparatus and article of manufacture for performing alias refinement is disclosed. Initially, a determination is made as to whether a load of an address exists for a variable in an intermediate representation of the source code. If a load of the address exists for the variable, a further determination is made whether each use of the address is for an indirect reference of the variable. If a particular use of the address is for an indirect reference of the variable, the indirect reference is replaced with a direct reference in the intermediate representation. If all uses of the address are for an indirect reference of the variable, the variable is removed from an alias set used with the intermediate representation.

26 Claims, 4 Drawing Sheets

```
@S1 a = proc1 ();
CALL proc1   //Call procedure 'proc1'
STR   a      //Store return value into 'a'
@S2 proc2(a);
LDA   a      //Load address of 'a'
STR   i      //Store address of 'a' into inline parameter 'i'
@S3 (*i)++;
LOD   i      //Load 'i'
IND   int*   //Load integer value pointed to by 'i' (indirect load of 'a')
INC   1      //Increment value
LOD   i      //Load 'i'
STO   int*   //Store increment integer value at location pointer to by 'i'
             (indirect store to 'a')
@S4 *intPtr = 1;
LOD   1      //Load value 1
LOD   intPtr //Load 'intPtr'
STO   int*   //Store 1 at location pointed to by 'intPtr'
@S5 return (a);
LOD   a      //Load 'a'
RET          //Return
```

Fig. 4

```
@S1 a = proc1 ();
CALL proc1   //Call procedure 'proc1'
STR   a      //Store return value into 'a'
@S3 (*i)++;
LOD   a      //Load 'a'
INC   1      //Increment value
STR   a      //Store incremented value into 'a'
@S4 *intPtr = 1;
LOD   1      //Load value 1
LOD   intPtr //Load 'intPtr'
STO   int*   //Store 1 at location pointed to by 'intPtr'
@S5 return (a);
LOD   a      //Load 'a'
RET          //Return
```

METHOD AND APPARATUS FOR REFINING AN ALIAS SET OF ADDRESS TAKEN VARIABLES

BACKGROUND OF THE INVENTION

1. Field of the Invention

The invention relates to computers and computer software. More particularly, the invention relates to a method and apparatus for refining an alias set of address taken variables.

2. Background of the Related Art

Computer systems run or execute software programs to implement a variety of functions. These software programs or computer programs are conventionally written in a high-level language, e.g., C++. In particular, C++ is an object-oriented programming language in which programs are created using abstractions and constructs to create user-defined classes for defining the methods and variables for a particular type of object. All objects of a particular class are identical in form and behavior but contain different data on their variables.

The text of a computer program written in such a high-level language is called the source code. However, to more efficiently run a computer program, the computer program is conventionally converted from source code to machine language. A compiler is a computer program that converts or, more particularly, compiles source code into machine language. A compiled version of source code is called object code.

The source code often contains many indirect references to variables. The indirect references represent address locations of the memory used to load or store a value of the variable. Common uses of the indirect reference include an indirect store and a procedure call. To compile or translate such indirect references, the compiler generates alias information for the indirect references. One form of alias information is a data structure known as an "address taken" alias set. The address taken alias set is a grouping of variables that are indirectly referenced in the source code.

However, variables in the address taken alias set may be "killed", i.e., invalidated, when a backend of the compiler generates the object code from an intermediate representation of the source code. In particular, variables from the address taken alias set are invalidated when the compiler backend translates instructions containing uses of indirect references, e.g., an indirect store through a pointer, and a procedure call, into object code. Once the variables in the address taken alias set have been invalidated, the computer system must access variables from memory instead of accessing these variables from processor registers to run or execute the generated object code.

Given the current state of the art, access of variables from memory is much slower than access of variables from the processor registers. As such, when the variables in the address taken alias set are invalidated, the optimization of the compiler is limited. In turn, the limited optimization results in an increased execution time or run-time of the generated object code. Thus, there is a need in the art to improve the compiling of source code containing indirect references to variables.

SUMMARY OF THE INVENTION

The invention provides a method, apparatus and article of manufacture for improving the run-time of an object code generated from an intermediate representation of a source code. In one embodiment, the run-time of the object code is improved by performing alias refinement. Initially, the intermediate representation is processed to determine whether a load of an address exists for a variable contained in the intermediate representation. If a load of the address exists for the variable, then all the uses of the address are processed. Such uses of an address may include indirect references to the variable. In one embodiment, the indirect reference may comprise a parameter in a procedure call.

Each use of the address is processed to determine whether the use is an indirect reference of the variable. If a particular use of the address is for an indirect reference of the variable, the indirect reference is replaced with a direct reference in the intermediate representation. If all uses of the address are for an indirect reference of the variable, the variable is removed from an alias set used with the intermediate representation.

The removal of the variable from the alias set, e.g., an address taken alias set, and the replacement of indirect references avoids the need to place variables into memory when the generated object code is executed. As such, a computer system may use processor registers instead of the memory to access variables when the object code is executed. This provides for improved optimization of the compiler to decrease the run-time of the object code.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
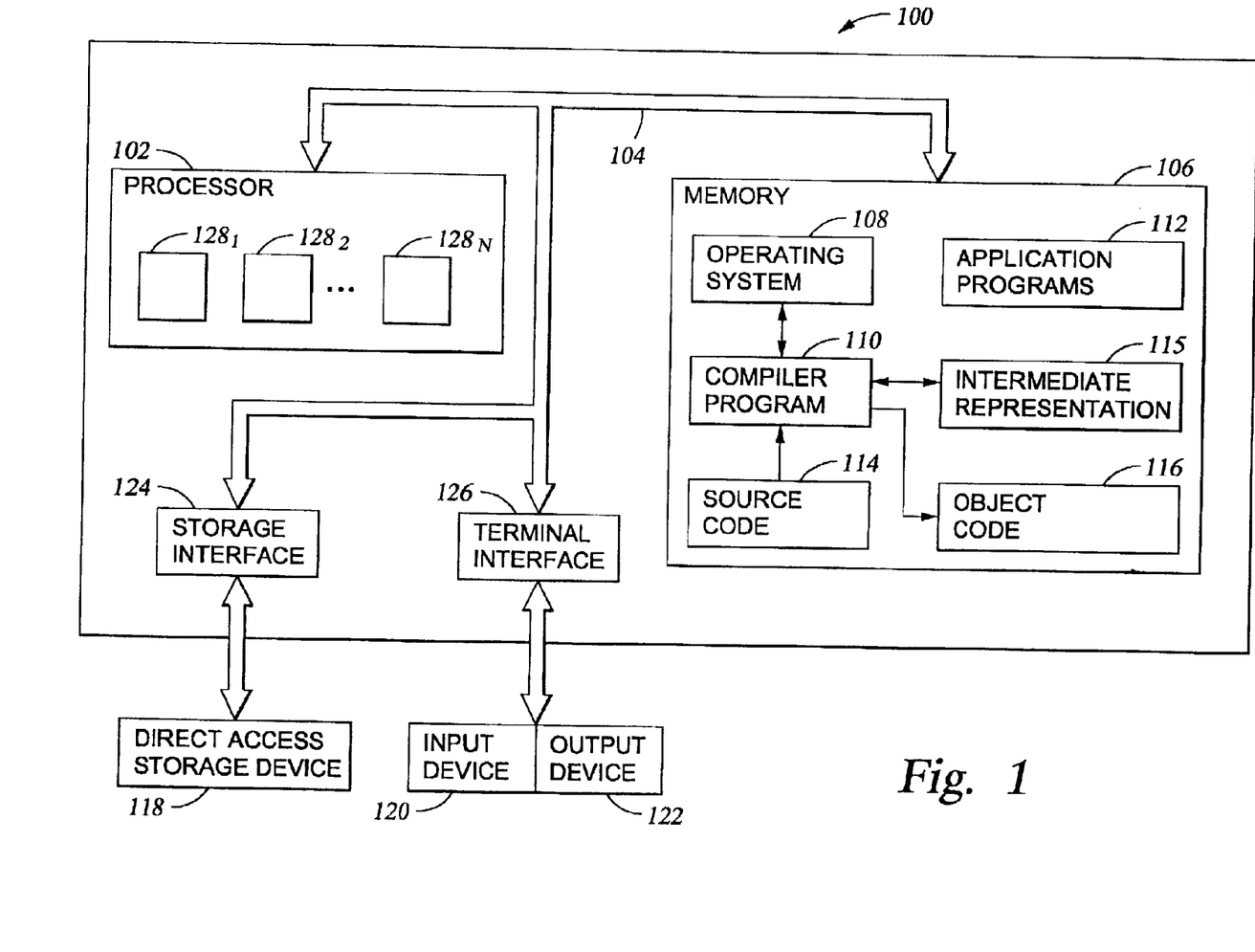
FIG. 1 depicts a block diagram of a computer system utilized to implement the present invention.

FIG. 1 depicts an illustrative computer system 100 utilized in accordance with the present invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an E-Server iSeries 400 or AS/400 available from International Business Machines of Armonk, N.Y.

The computer system 100 is shown in a programming environment having at least one processor 102, which obtains instructions and data from a main memory 106 via a bus 104. In one embodiment, the processor 102 may comprise a plurality of registers $128_1$, $128_2$, ..., $128_N$ (hereinafter $128_N$) for limited storage of information. The main memory 106 includes an operating system 108, a compiler program 110 (hereinafter called "compiler"), and various application programs 112. Additionally, the memory 106 includes source code 114, intermediate representation 115 of the source code 114, object code 116 and various data structures. The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. In one embodiment, the computer system 100 is illustratively coupled to a storage medium 118, input devices 120, and output devices 122. The storage medium 118 is operably coupled to the computer system 100 via a storage interface 124. One example of the storage interface 124 is a disk drive, e.g., floppy drive, optical drive, tape backup, and the like. The input devices 120 and output devices 122 are coupled to the computer system 100 via an input/output interface 126.

The storage medium 118 may comprise either a permanent or removable direct access storage device (DASD). The input devices 120 may comprise any device utilized to provide input to the computer system 100. Examples of input devices 120 include a keyboard, a keypad, a light pen, a touch screen, a button, a mouse, a track ball, a speech recognition unit, and the like. The output devices 126 may comprise any conventional display screen. Although shown separately from the input devices 120, the output devices 126 and input devices 120 could be combined. For example, a display screen with an integrated touch screen, and a display with an integrated keyboard, or a speech recognition unit combined with a text speech converter could be used.

The operating system 108 is the software utilized to operate the computer system 100. Examples of the operating system 108 include IBM OS/400, UNIX, IBM AIX, Microsoft Windows, and the like. The compiler 110 is a software program that translates the source program 114 into the object code 116. More specifically, the compiler 110 analyzes the source code 114 to generate an intermediate representation 115 of the source program 114. The compiler 110 then translates the intermediate representation 115 into the object code 116. As such, the compiler 110 is visualized as comprising a front-end and a back-end, in which the front-end generates the intermediate representation from the source code 114 and the back-end generates the object code 116 from the intermediate representation 115. The front-end of the compiler 110 may also generate data structures used to create or generate the object code 116. Examples of such data structures are further described with respect to FIG. 2.

The source code 114 comprises one or more programs or files written in a programming language or some other code that the compiler 110 may translate into the object program 116. Examples of programming languages include Fortran, Ada, Cobol, Modula-2, Pascal, Java, Visual Basic, C, C+, C++, and the like. The intermediate representation 115 is a format of the source code 114 generated by the front-end of the compiler 110. The object code 116 comprises one or more files or programs used or executed by the operating system 108 or a particular application program 112.

One important feature in the compiler arts is to optimize the generation of object code 116 from the source code 114. Such optimization is implemented as a "program optimizer" function in the compiler 110. There are different modes or ways to optimize the compiler 110. For example, the optimization may minimize the object code 116 generated from the source code 114. One embodiment of the compiler 110 provided herein is optimized by improving the run time or execution time of the object code generated from an intermediate representation 115 of the source code 114.

In general, the routines executed to implement the embodiments of the invention, whether implemented as part of an operating system or a specific application, component, program, object, module or sequence of instructions are in the compiler program 110, or the compiler 110. The compiler 110 typically comprises one or more instructions that are resident at various times in various memory and storage devices in the computer system 100. When read and executed by one or more processors 102 in the computer system 100, the compiler 110 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
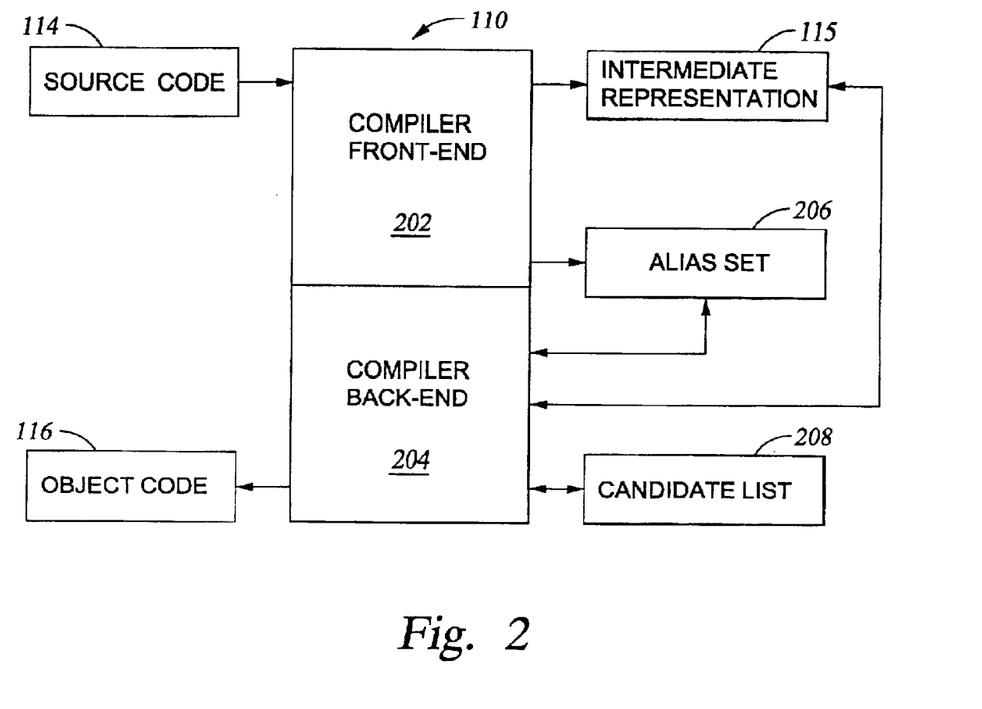
FIG. 2 depicts a conversion of source code to object code by a compiler program.
Figure 3:
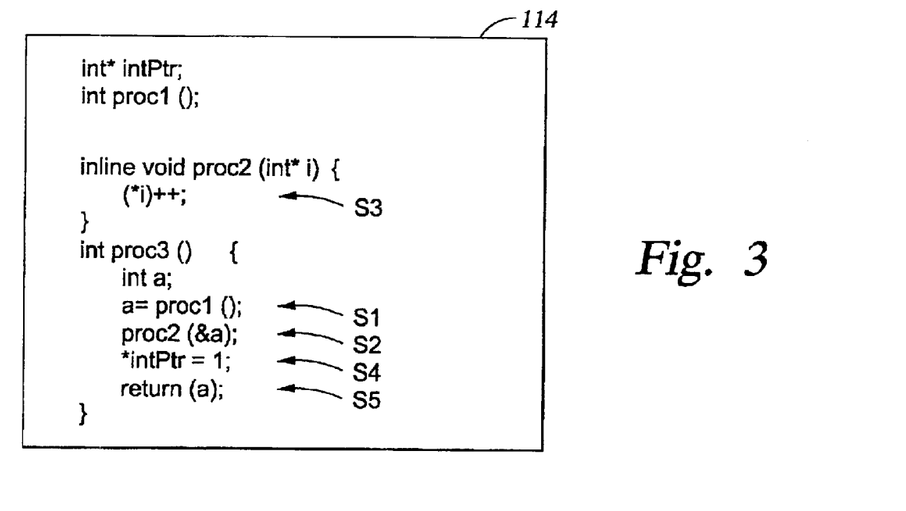
FIG. 3 depicts one example of the source code of FIG. 2.

FIG. 2 depicts the conversion of source code 114 to object code 116 by the compiler program 110. Specifically, the compiler 110 is operably configured as a front-end portion 202 and a back-end portion 204. The front-end portion 202 or compiler front-end analyzes or parses the source code 114 to verify the syntax and semantics of the source code to a particular high level programming language. For example, the front-end 202 analyzes the source code 114 to verify whether the source code 114 is written in accordance to the C++ programming language. An example of source code 114 is shown in FIG. 3.

Figure 4:
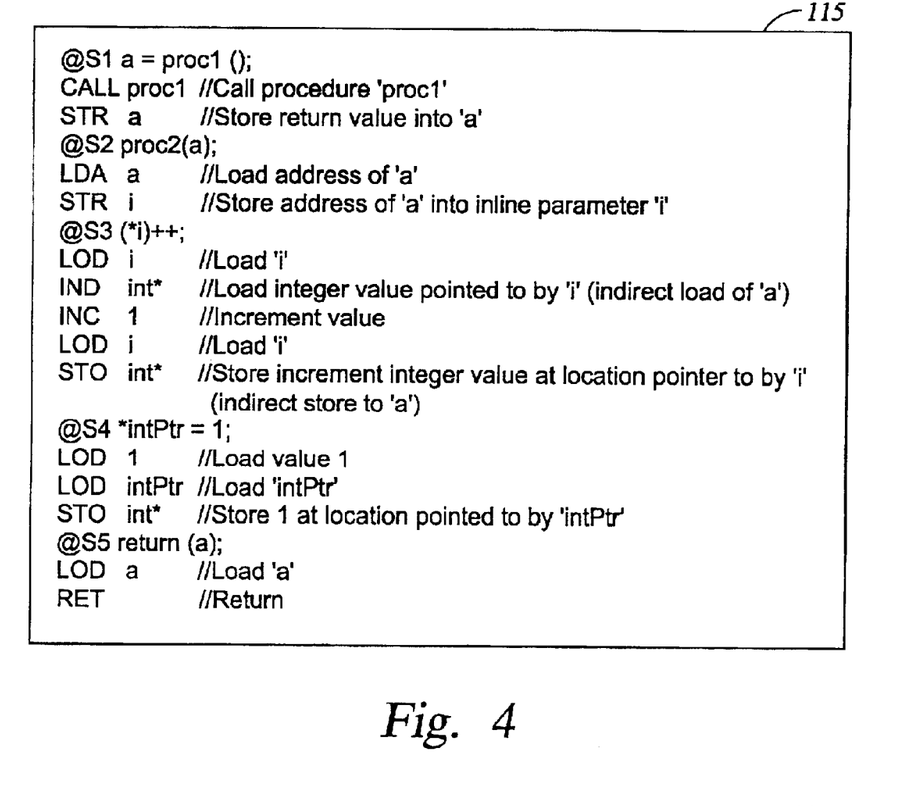
FIG. 4 depicts an intermediate representation of the source code of FIG. 3.
Figure 6:
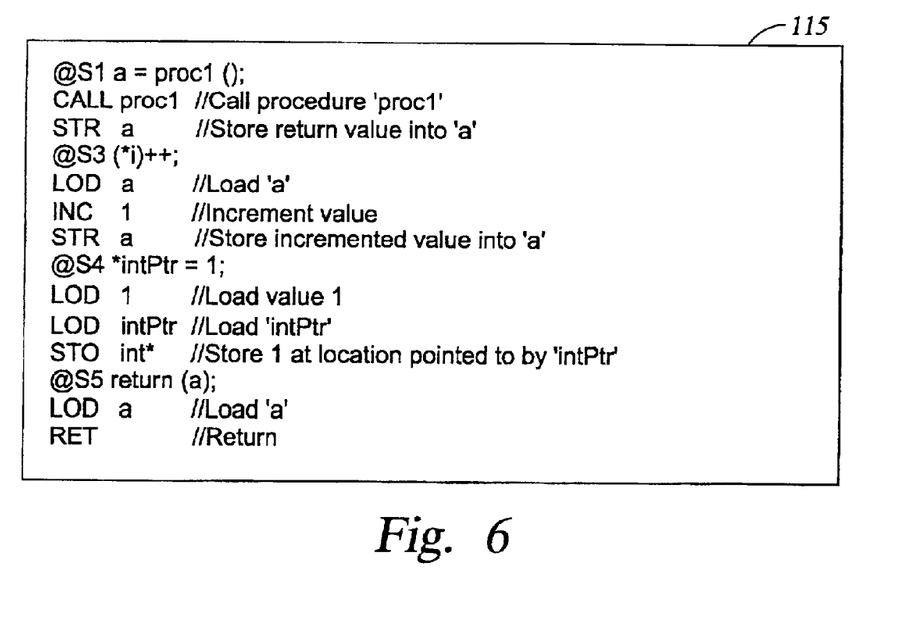
FIG. 6 depicts a revision of the intermediate representation of FIG. 4 after implementing the method of FIG. 5.

The front-end portion 202 also generates an intermediate representation 115 of the source code 114, and alias information for the source code 114. The alias information includes at least one alias set 206 which is a list or grouping of variables. The intermediate representation 115 is a machine-independent translation of the source code 114 used to generate the object code 116 by the back-end portion 204. Examples of the intermediate representation 115 are depicted in FIGS. 4 and 6.

The alias set 206 is a group or objects or variables having a common property. The alias set 206 is represented as a data structure generated by the front-end portion 202 and used by the back-end portion 204. In one embodiment, the alias set 206 specifies variables that can be indirectly referenced. Such an alias set 206 is also referred to as an "address taken" alias set 206. The address of the variable is taken when a load of an address of the variable, i.e., an address load of the variable, occurs in the intermediate representation 115.

The front-end 202 adds or lumps a variable in the address taken alias set 206 when an indirect reference to an variable is detected in the source code 114. The indirect reference includes a reference to an address of the variable instead of the variable itself. The use of indirect references enables a pointer to indirectly access the variable by specifying an address for that variable.

In one embodiment, the back-end 204 derives a candidate list 208 from the intermediate representation 115. The candidate list 208 is a data structure containing variables requiring a load of an address in the intermediate representation 115. The candidate list 208 is further described with reference to FIG. 5. The back-end 204 then uses the candidate list 208 to refine the alias set 206 and update the intermediate representation 115.

More specifically, the back-end 204 determines whether an address load exists for each variable in the intermediate representation 115. For each load address, the back-end 204 determines the uses of the address specified in the address load. If a particular use is an indirect reference, e.g, a pointer, in the intermediate representation 115, the indirect reference is replaced with a direct reference. If any of the uses are not indirect references, then the variable is removed from the candidate list 208 and is no longer a candidate for removal from the address taken alias set 206. As such, the variable is removed from the address taken alias set 206 only if all the uses of the address are indirect references.

Once the alias set 206 is refined and the intermediate representation 115 is updated, the back-end 204 uses the refined alias set 206 to generate the object code 116, i.e., translate or convert the intermediate representation 115 into object code 116. The object code 106 is then executed using the operating system 108 or an application program 112.

To run or execute the object code 116, the processor 102 interacts with the processor registers $128_N$ and the memory 106. Given that the memory access is much slower than the speed of the processor 102, the access of values from the processor registers $128_N$ is much faster than access of values from the memory 106. As such, the values of the variables are preferably stored in and retrieved from the processor registers $128_N$.

If, however, the variables are killed or invalidated from the alias set 206, the values of the variables must be stored in the memory 106. The reason for this storage in memory 106 is due to the processing of the alias set 206 by the back-end 204. Specifically, the back-end 204 ensures that the latest value assigned to the variable is stored in the memory 106, which ensures that the correct value is read or loaded from the memory 106. In the case of an indirect store operation, the back end 204 uses the alias set 206 to mark or identify all possible variables that are potentially written to. Since the indirect store may affect any variable in the alias set 206, the back-end 204 will kill or invalidate any variable of the alias set in the processor registers $128_N$. With the variables deleted from the processor registers $128_N$, the back-end 204 must generate code 116 to read the current value from the memory 106.

Thus, the removal of variables from the address taken alias set enables the processor 102 to execute the object code 116 by accessing values in processor registers $128_N$ instead of accessing values from the memory 106. The indirect references to the variable are replaced to prevent the adding of the variable into the address taken alias set 206. By enabling the access of the processor registers $128_N$, the run-time of the object code 116 is greatly improved, e.g., reduced.

FIG. 3 depicts one example of the source code 114 of FIG. 2. The exemplary source code 114 comprises three variable definitions for variables intPtr, 'i' and 'a', and three procedure definitions for procedures proc1, proc2 and proc3. Variables 'intPtr' and 'i' are pointer variables to an integer value and variable 'a' is an integer variable. The variable 'a' is entered in the address taken alias set 206. Procedures proc1 and proc3 are procedures used to return integer values and procedure proc2 is an inline procedure. The argument or parameter of the inline procedure proc2 is the value referenced by the pointer variable i. In one embodiment, the front-end 202 of the compiler 110 substitutes a call to the inline procedure with statements or instructions contained in the inline procedure.

In addition to the variable and procedure definitions, the exemplary source code 114 comprises five statements or instructions S1, S2, S3, S4 and S5. Statement S1 sets the value of variable 'a' to the result of a procedure call of procedure proc1. Statement S2 comprises a call to procedure proc2. The argument in the call of procedure proc2 is the address or location in the memory 106 for variable 'a'. The use of variable 'a' in the called procedure proc2 is an indirect reference through the pointer parameter 'i'. Statement S3 comprises an increment of the integer pointed to by the pointer variable 'I'. Statement S4 comprises an indirect store of a value at an address pointed or referenced by the pointer variable intPtr. The indirect store causes the compiler back-end 204 to kill variables, e.g., 'a', in the address taken alias set 206. Statement S5 comprises a return of the value 'a'.

FIG. 4 depicts an intermediate representation 115 of the source code of FIG. 3. The intermediate representation 115 comprises instructions or operations to implement the statements of the source code 114 at the back-end 204. Specifically, statement S1 is represented with a call to procedure proc1 and a store of the value returned from procedure proc1 into variable 'a'. Statement S2 is represented with a load of the address for the variable 'a' and a store of the address in the pointer variable 'i' as a parameter 'i' of the inline procedure proc2. Statement S3 is represented with a load of the pointer variable 'i', a load of the integer referenced or pointed to by the pointer variable 'i', an increment of the value pointed to, another load of the pointer variable 'i', and a store of the incremented integer at location referenced to by the pointer variable 'i'. The load of the integer referenced by the pointer variable 'i' is an indirect load of the variable 'a'. Similarly, the store of the incremented integer referenced by the pointer variable 'i' is an indirect store of the variable 'a'. Statement S4 is represented with a load of the integer value 1, a load of the pointer variable 'intPtr' and a store of the integer value 1 at the address or location referenced to by the pointer variable 'intPtr'. Statement S5 is represented with a load of the variable 'a' and a return command or operation.

Figure 5:
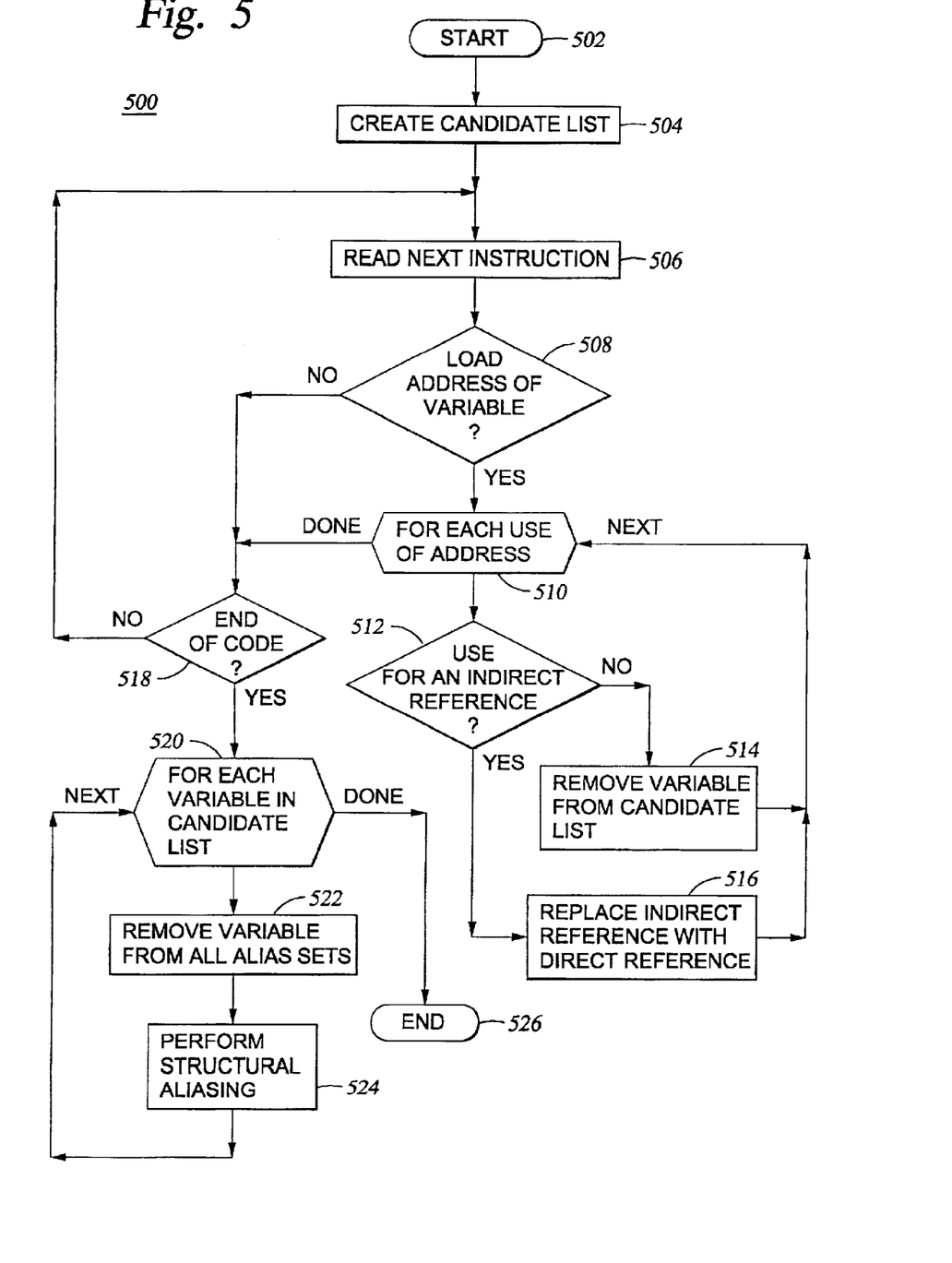
FIG. 5 depicts a flow diagram of a method for modifying an intermediate representation containing indirectly referenced variables in accordance to the present invention.

FIG. 5 depicts a flow diagram of a method 500 for modifying an intermediate representation 115 containing indirectly referenced variables. In one embodiment, the method 500 is implemented in the back-end 204 of the compiler program 110. The method 500 refines the alias set 206. Additionally, the method 500 modifies the exemplary intermediate representation 115 of FIG. 4 into the intermediate representation 115 further described with respect to FIG. 6.

The method 500 starts at step 502 and proceeds to step 504 where a candidate list 208 is created for the intermediate representation 115 of the source code 114. The candidate list 208 is a data structure containing variables eligible for alias refinement, e.g., removal from the alias set 206. Each variable in the candidate list 208 requires a load of an address for that variable in the intermediate representation 115.

The method 500 proceeds to step 506 where the next instruction in the intermediate representation 115 is read or processed. At step 508, a query determines whether the instruction includes a load address of a variable, i.e., a load of an address of a particular variable. If the instruction includes no load address of a variable, the method 500 proceeds to step 518. If the instruction does include an address load of a variable, the method 500 proceeds to step 510 where each use of the address for the variable is processed. Uses of the address may include the use of pointer variables as an indirect store as in statement S4 or as an argument to a called procedure as in statement S2. Additionally, multiple uses of the address are possible, e.g., multiple procedure calls, in the intermediate representation 115. Step 510 may process the uses with standard copy propagation techniques. For example, all uses of pointer variable 'i' are considered for the intermediate representation of FIG. 4.

At step 512, a query determines whether the use is for an indirect reference. If the use is not for an indirect reference, the method 500 proceeds to remove the variable from the candidate list 208 at step 514 and proceeds to the next use at step 510. The variable removed from the candidate list 208 is no longer eligible for removal from the alias set 206, e.g., an address taken alias set 206. If the use is for an indirect reference, the method 500 proceeds to replace the indirect reference with a direct reference at step 516 and proceeds to the next use at step 510. As such, all uses of a loaded address for an indirect reference are replaced with direct references. For example, step 516 would replace the indirect load and store in S3 with a direct load and store of a variable specified by the address. Once all the uses for a particular address load are complete, the method 500 proceeds to step 518.

At step 518, a query determines whether to process or read any more instructions in the intermediate representation 115. Namely, step 518 determines whether the end of the intermediate representation 115 has been reached. If there are more instructions to read, the method 500 returns to step 506. If there are no more instructions to read, the method 500 proceeds to step 520 where each variable in the candidate list 208 is processed. At step 522, the next variable in the candidate list 208 is removed from all the alias sets 206 including the address taken alias set 206. The method 500 then proceeds to step 524 where structural aliasing is performed. After all the variables in the candidate list 208 are processed, the method 500 ends at step 526.

FIG. 6 depicts a revision of the intermediate representation 115 of FIG. 4 after implementing the method 500 of FIG. 5. The replacement of an indirect reference to variable 'a', e.g., pointer variable 'i' in the inlined procedure proc2, with a direct reference of the variable 'a' is shown in the modified intermediate representation 115 of FIG. 6. Specifically, the load of the pointer variable 'i' and the indirect load of the variable 'a', i.e., the load of an integer referenced by the pointer variable, in statement S3 is replaced with a direct load of the variable 'a'. Similarly, the load of pointer variable 'i' and the indirect store of the variable 'a' in statement S3 is replaced with a direct store of the variable 'a'. The removal of indirect references eliminates the need for statement S2 in the modified intermediate representation 115.

The modification of the intermediate representation 115 and the removal of variables from the alias set 206 improves the efficiency or performance of the generated object code 114. More specifically, memory accesses are avoided during the run-time of the object code 114. These memory accesses would otherwise have been required, if the variables of the alias set 206 were killed or invalidated. To understand the effect of these changes, a contrast between the intermediate representations 115 of FIGS. 4 and 6 is described below in further detail. Specifically, the modified form of the intermediate representation 115 eliminates the following five operations when the generated object code 116 is executed by the processor 102.

First, the modified representation 115 does not require a mapping to storage in the memory 106 for the variable 'a' when the object code 116 is executed. Such a map to storage 106 would have been required if the address of the variable is taken. The address is taken if the intermediate representation 115 of FIG. 4 contains indirect references to the variable 'a' in the form of an indirect load and an indirect store in statement S2. With the use of these indirect references, different variables may reference the value of the variable 'a'. This requires the allocation of a location in the memory 106 for any variable 'a' that is indirectly referenced. However, when such indirect references are replaced in the method 500, then the value of the variable 'a' are kept in the processor registers $128_N$ during execution of the object code 116. Given the speed of the processor 102 is much faster than the speed of a memory access, the access of variables from the processor registers $128_N$ reduces the time to execute or run the object code 116.

Second, the value of the variable 'a' no longer needs to be written out to storage to execute the object code 116 for statement S1. As shown in the intermediate representation 115 of FIG. 4, the indirect load of value pointed to by the pointer variable 'i' may be referring to the variable 'a'. Since the variable 'a' and the value referred to by the pointer variable 'i' are aliases, the compiler back-end 204 ensures that all values in the alias set 206 are current in the memory 106. However, when the back-end 204 processes the indirect load in statement S3, the current value of the variable 'a' may be killed or invalidated in the registers $128_N$. To avoid this problem, the value of variable 'a' is written out to memory 106 in statement S1. In contrast, the method 500 replaces the indirect references with direct references in the intermediate representation 115. Thus, when the object code 116 is executed, the value of variable 'a' is kept in the processor registers $128_N$ instead of the memory 106.

Third, there is no need to compute the address of the variable 'a' in statement S2. In the representation 115 of FIG. 4, there are indirect references to the variable 'a', e.g., in the form of references to the pointer variable 'i', so the compiler back end 204 must compute the address of variable 'a' and store the computed address in the pointer variable 'i'. As the method 500 removes these indirect references, the modified intermediate representation 115 of FIG. 6 no longer requires statement S2.

Fourth, a load from memory 106 and a write to memory 106 is no longer required to execute the object code 116 for statement S3. In the intermediate representation 115 of FIG. 4, statement S3 contains the first reference to a value referred by the pointer variable 'i'. To implement the execution of object code 116 for this reference, a load from memory of the value referred by the pointer variable 'i' is required. The incremented value is then written back into memory 106. The value in memory 106 is kept current since there are additional aliased references to the variable 'a' in the representation 115, e.g., the indirect store in statement S4 and the load of the variable 'a' in statement S5. In contrast, the method 500 replaces the indirect references of variable 'a', e.g., by the pointer variable 'i', with direct references in the intermediate representation 115. Thus, when the object code 116 is executed, the value of variable 'a' is kept in the processor registers $128_N$ instead of the memory 106.

Fifth, a load of the variable 'a' from the memory 106 is avoided when the object code 116 is executed to implement statement S5. For the intermediate representation 115 of FIG. 4, since 'a' and '*intPtr' are aliases, e.g, in the same alias set 206, the indirect store in statement S4 may have killed any value of the variable 'a' that may have been in the processor registers $128_N$. In converting statement S4, the back end 204 would have killed or invalidated the value of 'a' stored in the registers $128_N$ at statement S1. After the killing of variable 'a' using the address taken alias set 206, the load operation must now read the current value from memory instead of the processor registers $128_N$.

By modifying the intermediate representation 115 and the removing variables from the alias set 206, the method 500 avoids the need to implement the five operations described above. This reduces the execution time or run time of the generated object code 116. While the illustrative example is simple in nature, the execution time of the object code 116 is even further reduced for larger source codes 114 and intermediate representations 115.

Although various embodiments which incorporate the teachings of the present invention have been shown and described in detail herein, those skilled in the art can readily devise many other varied embodiments that still incorporate these teachings.

What is claimed is:

1. A method for performing alias refinement, the method comprising:
   determining whether a load of an address exists for a variable in an intermediate representation of a source code;
   determining, if the load of the address exists for the variable, whether each use of the address is for an indirect reference to the variable;
   replacing, if a particular use of the address is for an indirect reference to the variable, the indirect reference in the intermediate representation with a direct reference to the variable; and
   removing, if all uses of the address are for an indirect reference to the variable, the variable from an address taken alias set used with the intermediate representation.

2. The method of claim 1 wherein the address load determining, the use determining and replacing is repeated for each instruction in the intermediate representation.

3. The method of claim 1 further comprising:
   creating a candidate list for the intermediate representation, where the candidate list contains the variable that requires the load of the address for the variable in the intermediate representation; and
   removing, if one use of the address involves no indirect reference, the variable from the candidate list.

4. The method of claim 3 wherein the variable remaining on the candidate list is removed from the address taken alias set.

5. The method of claim 1 wherein the use of the address is represented with a pointer variable.

6. The method of claim 1 wherein the use of the address is represented in the intermediate representation with a load address command and a load of a value pointed by a pointer variable.

7. The method of claim 1 wherein the indirect reference in the intermediate representation comprises one of an indirect store of the variable to a memory and an indirect load of the variable from the memory.

8. The method of claim 1 wherein the indirect reference is a parameter in an inline procedure call.

9. The method of claim 1 wherein the use determining comprises:
   propagating the uses of the address in the intermediate representation.

10. The method of claim 1 further comprising:
    generating, after the replacing and the removing, the object code from the intermediate representation using the alias set; and
    executing the object code.

11. A method for performing alias refinement, the method comprising:
    determining whether a load of an address exists for a variable in an intermediate representation of a source code;
    determining, if the load of the address exists for the variable, whether each use of the address is for an indirect reference to the variable and a particular use of the address is a parameter in a procedure;
    replacing, if a particular use of the address is a parameter in a procedure call, in the intermediate reference the parameter with a direct reference to the variable; and
    removing, if all uses of the address are for a parameter in a procedure call, the variable from an address taken alias set used with the intermediate representation.

12. An apparatus for performing alias refinement, the apparatus comprising:
    a memory for storing a compiler program; and
    a processor comprising a plurality of registers, where upon executing the compiler program, the processor is configured to:
    determine whether a load of an address exists for a variable in an intermediate representation of a source code;
    determine, if the load of the address exists for the variable, whether each use of the address is for an indirect reference to the variable;
    replace, if a particular use of the address is for an indirect reference to the variable, the indirect reference in the intermediate representation with a direct reference to the variable; and
    remove, if all uses of the address are for an indirect reference to the variable, the variable from an alias set used with the intermediate representation.

13. The apparatus of claim 12 wherein the processor determines the address load, determines the use, and replaces the indirect reference for each instruction in the intermediate representation.

14. The apparatus of claim 12 wherein the processor is further configured to:
    create a candidate list for the intermediate representation, where the candidate list contains the variable that requires the load of the address for the variable in the intermediate representation; and remove, if one use of the address involves no indirect reference, the variable from the candidate list.

15. The apparatus of claim 14 wherein the variable remaining on the candidate list is removed from the address taken alias set.

16. The apparatus of claim 12 wherein the processor is further configured to:
generate, after the replacing and the removing, the object code from the intermediate representation using the alias set; and
execute the object code.

17. A computer readable medium storing a software program that, when executed by a computer, causes the computer to perform a method comprising:
determining whether a load of an address exists for a variable in an intermediate representation of a source code;
determining, if the load of the address exists for the variable, whether each use of the address is for an indirect reference to the variable;
replacing, if a particular use of the address is for an indirect reference to the variable, the indirect reference in the intermediate representation with a direct reference to the variable; and
removing, if all uses of the address are for an indirect reference to the variable, the variable from an alias set used with the intermediate representation.

18. The computer readable medium of claim 17 wherein the address load determining, the use determining arid replacing is repeated for each instruction in the intermediate representation.

19. The computer readable medium of claim 17 wherein the method further comprises:
creating a candidate list for the intermediate representation, where the candidate list contains the variable that requires the load of the address for the variable in the intermediate representation; and
removing, if one use of the address involves no indirect reference, the variable from the candidate list.

20. The computer readable medium of claim 19 wherein the variable remaining on the candidate hat as removed from the address taken alias set.

21. The computer readable medium of claim 17 wherein the use of the address is represented with a pointer variable.

22. The computer readable medium of claim 17 wherein the use of the address is represented in the intermediate representation with a load address command and a load of a value pointed by a pointer variable.

23. The computer readable medium of claim 17 wherein the indirect reference in the intermediate representation comprises one of an indirect store of the variable to a memory and an indirect load of the variable from the memory.

24. The computer readable medium of claim 17 wherein the indirect reference is a parameter in a procedure call.

25. The computer readable medium of claim 17 wherein the use determining comprises:
propagating the uses of the address in the intermediate representation.

26. The computer readable medium of claim 17 wherein the method further comprises:
generating, after the replacing and the removing, the object code from the intermediate representation using the alias set; and
executing the object code.

* * * * *

UNITED STATES PATENT AND TRADEMARK OFFICE
CERTIFICATE OF CORRECTION

PATENT NO. : 6,925,636 B2
DATED : August 2, 2005
INVENTOR(S) : Haugen et al.

It is certified that error appears in the above-identified patent and that said Letters Patent is hereby corrected as shown below:

<u>Column 11,</u>
Line 30, "arid" should be -- and --,

<u>Column 12,</u>
Line 8, "hat" should be -- list --,
Line 8, "as" should be -- is --.

Signed and Sealed this

Eleventh Day of October , 2005

JON W. DUDAS
*Director of the United States Patent and Trademark Office*